No. 837,628. PATENTED DEC. 4, 1906.
J. M. LANSDEN, Jr.
MOTOR VEHICLE.
APPLICATION FILED OCT. 14, 1904.
3 SHEETS—SHEET 1.
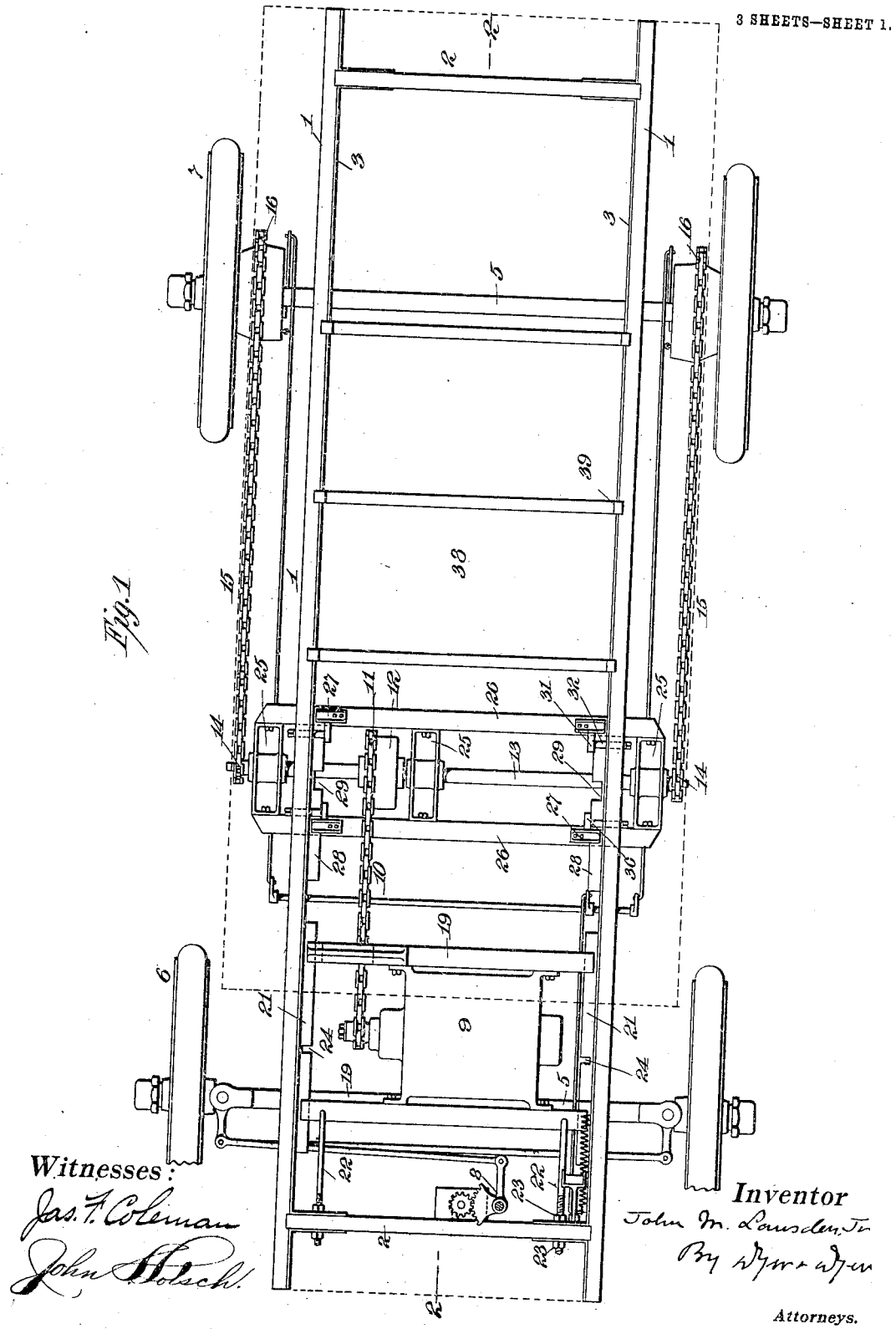
Witnesses:
Inventor
John M. Lansden, Jr.
Attorneys.

No. 837,628. PATENTED DEC. 4, 1906.
J. M. LANSDEN, Jr.
MOTOR VEHICLE.
APPLICATION FILED OCT. 14, 1904.
3 SHEETS—SHEET 2.
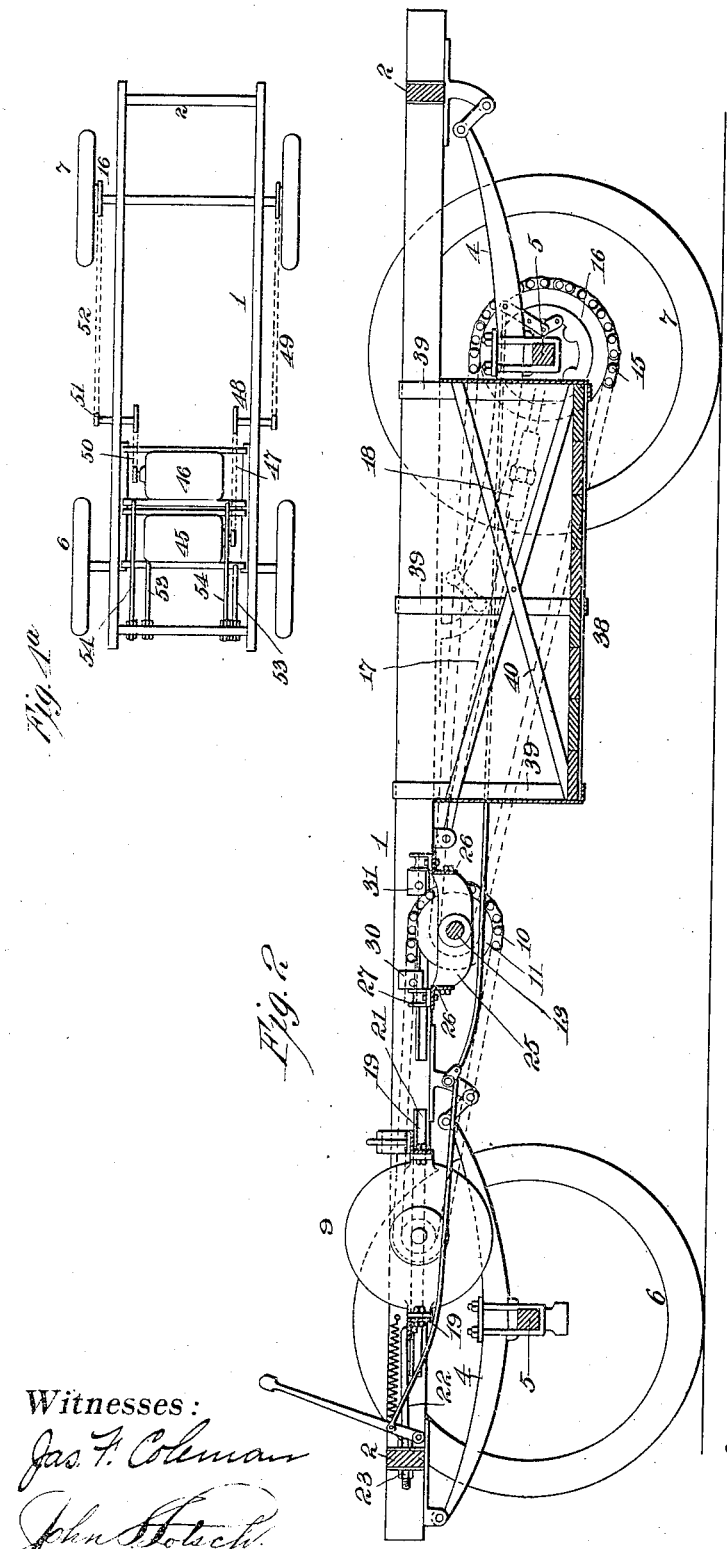
Witnesses:
Jas. F. Coleman
John Hotsch
Inventor
John M. Lansden, Jr.
By Dyer & Dyer
Attorneys.

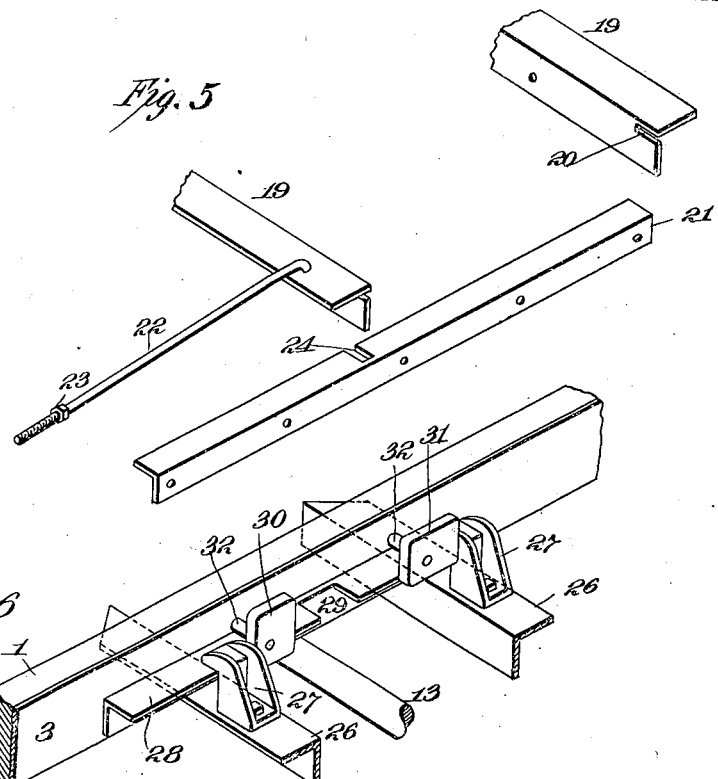
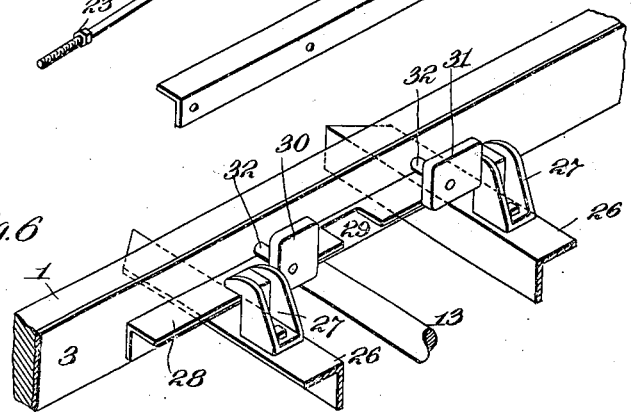
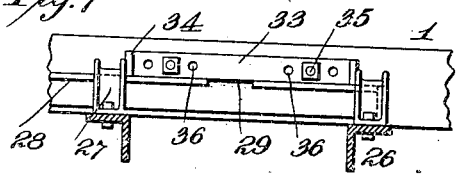
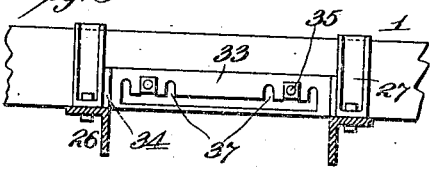
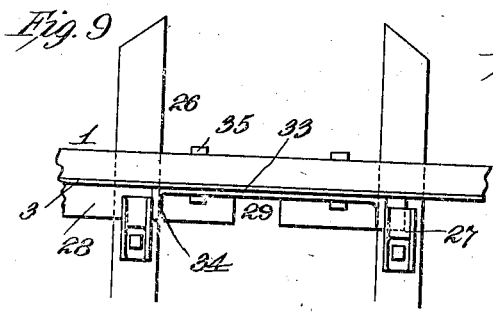
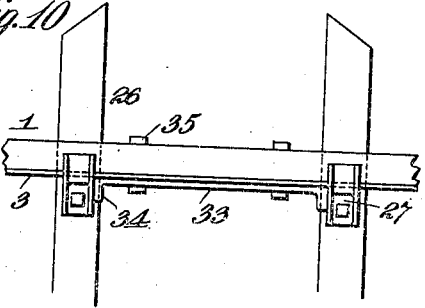

UNITED STATES PATENT OFFICE.

JOHN M. LANSDEN, JR., OF ORANGE, NEW JERSEY.

MOTOR-VEHICLE.

No. 837,628.

Specification of Letters Patent.

Patented Dec. 4, 1906.

Application filed October 14, 1904. Serial No. 228,416.

*To all whom it may concern:*

Be it known that I, JOHN M. LANSDEN, Jr., a citizen of the United States, residing in Orange, county of Essex, State of New Jersey, have invented certain new and useful Improvements in Motor-Vehicles, of which the following is a specification.

This invention relates to motor-vehicles, and more particularly to electrically-propelled vehicles and the framework and driving connections thereof.

The object I have in view is to produce a frame upon which the motor-driving connections and battery may be so placed as to have the proper proportion of weight upon the front and back wheels.

Another object is to simplify the construction of the frame and reduce the cost thereof, and particularly to make it possible to employ standard size and type of motor-supports and gearing-supports which may be used upon frames of different lengths without change.

Another object is to produce a frame which may be assembled upon the wheels without the need of first attaching the motor and gearing and other expensive parts. Such parts may be purchased after the running-gear is assembled, thereby increasing the facility of manufacture and reducing the cost by the fact that capital is not tied up in the expensive parts of the vehicle until such parts are actually required for use.

Other objects I have in view are to increase the efficiency of the motor and gearing supports, as will more fully appear hereinafter.

I attain these objects by the mechanism illustrated in the accompanying drawings, in which—

Figure 1 is a plan view of the framework and running-gear of a motor-vehicle embodying my invention. Fig. 2 is a sectional view thereof, taken on the line 2 2 of Fig. 1. Figs. 3 and 4 are diagrammatic views of motor-vehicles, showing the different location of battery-boxes and counter-shaft and motor. Fig. 4ª is a plan view, on a reduced scale, of a modified form of framework. Fig. 5 is a perspective view of the parts of the motor-supporting framework, showing how it is removed from the main frame of the vehicle. Fig. 6 is a perspective view of the adjusting mechanism of the counter-shaft frame. Figs. 7 and 8 are side views of modifications of the mechanism shown in Fig. 6; and Figs. 9 and 10 are plan views of the devices illustrated in Figs. 7 and 8, respectively.

In all of the views like parts are designated by the same reference-numerals.

In carrying out my invention I provide a framework which comprises side members 1 1 and cross-pieces 2 2. The framework, as shown, is rectangular, the said side members being parallel, and is formed of wood, with a strengthening flat bar of metal 3 on the inside thereof. The length of the framework depends upon the character of the vehicle, and the number of cross-bars used may vary according to the length of the frame, cross-bars being introduced where necessary in order to secure the desired rigidity. The frame is mounted upon springs 4 4 and axles 5 5, to which are attached the front and rear wheels 6 and 7, respectively. The springs 4 4 are attached to the usual brackets, which may be bolted at any desired places upon the side pieces 1 1. The front axle is of the usual motor-vehicle-steering type and is provided with a steering-gear, a part of it being indicated at 8, which may be attached to one of the cross-pieces 2. The motor 9 instead of being upon or adjacent to the rear axle, as is the usual practice, is located at the front of the frame in order to secure a better distribution of weight. The motor drives through a chain 10 to a sprocket 11, secured to the differential 12 on the counter-shaft 13. The extremities of the counter-shaft carry sprockets 14, which engage with the chains 15 and transmit motion to the sprockets 16, mounted upon the hubs of the rear wheels 7 7. A thrust-rod 17, provided with an adjusting-turnbuckle 18, connects the rear axle to the frame, whereby the propelling strain is transmitted from the axle to the frame through the thrust-rod and not through the springs. The turnbuckle on the thrust-rod permits adjustment of the tension of the chain.

The motor 9 is mounted upon an auxiliary frame which comprises angle-irons 19 19. The extremities of the vertical web of each iron are cut away, forming notches 20, (see Fig. 5,) which engage with the horizontal web of angle-irons 21, bolted to the inside of the side pieces 1 1, which constitute ways, the angle-irons 19 19 being below the upper edges of the side pieces.

The angle-irons 19 are secured to the motor on the sides of the latter, preferably by being bolted to lugs formed upon the sides of the motor diametrically opposite to each other, as shown in Fig. 2. By this arrangement of supporting the motor the two supporting angle-irons 19 19 will be on the same horizontal plane and on the plane of the horizontal center of the motor. The two supports will also be practically upon the same plane as the line of pull of the chain 10. This arrangement of supports for the motor will tend to prevent twists and distortions of the motor and its supports and will therefore prevent breakage of parts and binding of the bearings.

When in position, the horizontal webs of the angles 19 19 will rest upon the horizontal webs of the angles 21 21, as shown in Fig. 1. The motor 9 being bolted to the angles 19 19, it rigidly holds the latter in parallel relation, so that the motor, with its frame, may be bodily moved in a horizontal direction and the chain 10 tightened or slackened, as desired. The structure produces a frame which is of extreme simplicity, lightness, and strength. The motor-frame is moved and secured in position by means of threaded rods 22, having adjusting-nuts 23 23, which engage with the forwardmost cross-piece 2. By this means the motor may be very readily moved backward and forward and the proper tension given to the chain 10. The rods 22 are subjected to a pulling strain only and not a pushing stress. Therefore they may be made very light and at the same time will not allow the chain to slacken. The pull of the rods 22 keeps the motor and its supporting-frame under tension in the direction of expansion and not in the direction of compression. Therefore the parts may be made very light.

In order to remove the motor and its frame from the main frame, the horizontal webs of the angle-irons 21 are provided at a suitable point with a notch 24, so that one of the angles 19 may be lifted vertically and disengaged from the angle-iron 21. This notch is in such a position that when the foremost angle-iron 19 is over the notch the rear angle-iron will be beyond the rear extremity of the angle-iron 21, and the frame may be bodily lifted upward, as shown in Fig. 5. The adjusting-rods 22 may then be disengaged from the cross-bar 2, if desired. By providing the motor-frame with means for removing it in this manner it may be lifted out of the main frame with great ease and without the need of moving it a great distance longitudinally. The angle-irons 21, with the notches 24 in them, may be attached to any desired point on the main frame of the vehicle. By being of some length, as illustrated, they may be secured in place by a large number of fastenings, distributed a considerable distance, which will not weaken the side members of the main frame.

The counter-shaft 13 is mounted in bearings 25 25, bolted to lateral angle-irons 26 26, constituting an auxiliary frame. The bearings 25 are sufficiently strong to produce a rigid framework, so that the shaft 13 will run freely in its bearings without binding, irrespective of the elasticity of the main frame. By this means simple straight-line bearings may be used for the counter-shaft and the need of employing self-alining or complicated and expensive bearings is obviated. The counter-shaft frame is carried below the side members 1 1 and may be secured thereto in various ways. As shown in Fig. 6, the angle-irons 26 are provided with hook-brackets 27, which engage with an angle-iron 28, secured to the inner side of the longitudinal members 1 1. By this arrangement the auxiliary frame may be moved longitudinally below the frame to provide for large adjustments of the chains 15, small adjustments being taken care of by the thrust-bars 17 and turnbuckles 18. Should, however, the chains stretch considerably, it may be found more convenient to adjust them by moving the counter-shaft than by moving the rear axle by means of the thrust-rods and turnbuckles. In order to remove the auxiliary frame, the angle-irons 28 are each provided with a notch 29 of sufficient width to allow one of the hook-brackets 27 to pass through it. This notch is located at such a point that when one hook-bracket is passed through it the other will be clear of the angle-iron 28.

In order to adjust the longitudinal position of the auxiliary frame, the mechanism illustrated in Fig. 6 may be employed. This comprises cam-plates 30 and 31, pivoted upon bolts 32 32. The cams 30 and 31 engage with the hook-brackets 27. The cam-plates are rectangular, as shown, the point of pivoting being eccentric. As shown in Fig. 6, the plate 30 has its longest axis vertical, while plate 31 has its longest axis horizontal. By rotating both cams the position of the auxiliary frame will be adjusted within very close limits.

Instead of the cam-plates above described a single plate 33, as shown in Figs. 7 and 9, may be employed. This plate has angular extremities 34, which engage with the brackets 27, and is secured to the side members 1 by means of bolts 35. A number of holes 36 are made in the plate 33, so as to allow proper adjustment, as will be evident. In lieu of the holes 36, as shown in Fig. 7, notches 37 (see Fig. 8) may be employed, the adjustment being secured by lifting the plate until the bolts 35 become disengaged from the notches and then moving it to the proper position.

The battery-box 38 is hung from the frame by means of vertical supports 39 and diagonal braces 40 in the usual manner. These supports 39 are shown as continuous straps passing under the box and having hooked extremities which engage with the top of the side members of the frame. A single box arranged between the counter-shaft and the rear axle may be employed, as shown in Fig. 2, or two boxes 41 42, one in front and one behind the rear axle, may be used, as shown in Fig. 3, or two boxes 43 44, one in front of and one behind the counter-shaft, as shown in Fig. 4, may be employed. Only these modifications are illustrated; but it is evident that the position of the motor, counter-shaft, and battery-boxes may be changed as desired by merely adjusting the length of the frame and placing the angle-irons 21 and 28 in the proper position. By making the frame of rectangular shape, as described, the motor and battery-boxes may be placed where desired, the same length of angle-irons 19 19 being capable of use at any part of the frame and the vertical supports 39 being capable of use at any position of the frame without any change whatever. This is particularly advantageous, as the separate portions of the vehicle may be manufactured and assembled in different forms without changing the parts in any way.

In building the main frame is adjusted upon the axles and wheels, the battery-boxes are built as desired, the supporting angle-irons are placed in position, the steering-gear, brake, controller, &c., may be attached, and the body built before the motor and counter-shaft are purchased. These latter may be cheaply and quickly attached to their frames and placed within the main frame at the last moment, thus cheapening the cost of manufacture of the vehicle by not tying up capital in the expensive parts.

In the modification shown in Fig. 4ᵃ two motors 45 46 are employed, each having the auxiliary frame described in connection with the single motor and mounted upon ways in the same manner. The motor 45 drives through a chain 47 to a short shaft 48 and from there by means of a chain 49 to one of the driving-wheels. The motor 46 is connected by a chain 50 to a shaft 51, similar to the shaft 48, and rotates the other driving-wheel by means of a chain 52. Screw-rods 53, similar to the rods 22, provided with nuts, are used for adjusting the tension of the chain 47. Additional rods 54 are employed for adjusting the tension of the chain 50. By this construction a differential is not required; but the motors may be adjusted and removed with as much facility as where a single motor is employed.

Having now described my invention, what I claim as new, and desire to secure by Letters Patent, is—

1. In a motor-vehicle, the combination with a frame, an auxiliary frame, said frame having hook-lugs engaging with the main frame, and means for preventing endwise movement of the lugs.

2. In a motor-vehicle, the combination with a main frame, an auxiliary frame, the main frame having an angle-iron, lugs carried by the auxiliary frame and engaging with the angle-iron, and a notch formed in the angle-iron to permit removal of the auxiliary frame.

3. In a motor-vehicle, the combination with a main frame, an auxiliary frame, the main frame having an angle-iron, lugs carried by the auxiliary frame and engaging with the angle-iron, and cams carried by the main frame and engaging with the lugs.

4. In a motor-vehicle, the combination with a main frame, an auxiliary frame, the main frame having an angle-iron, lugs carried by the auxiliary frame and engaging with the angle-iron, cams carried by the main frame and engaging with the lugs, and a notch in the angle-iron to permit the removal of the auxiliary frame.

5. In a motor-vehicle, the combination with a frame and supporting-wheels, the said frame having ways, of a plurality of motors thereon, the said motors being mounted in auxiliary frames engaging with the ways, of means for separately and independently adjusting the motors in relation to the frame.

6. A motor-vehicle having a frame and supporting-axles and steering and driving wheels, and connecting-springs, a counter-shaft on the frame, and connections between the counter-shaft and driving-wheels, the frame being of general rectangular shape, with parallel side members, a motor, angle-irons on the inside of the frame, angle-irons on the motor and arranged to engage with the angle-irons on the frame, the angle-irons on the motor being below the upper edge the frame, and the different angle-irons being so arranged that they may be located at any part of the vehicle-frame, a chain connecting the motor and counter-shaft, and a battery-box, and straps with hooked extremities passing under the battery-box, and engaging with the side members of the frame, the parts being so proportioned and arranged that the location of the motor, counter-shaft, and battery-box may be varied as desired, without changing the shape or proportions of the supports for the motor or battery-box.

7. In a motor-vehicle, the combination with a frame, and a motor, angle-irons on the sides of the motor, forming a supporting-frame therefor, and angle-irons on the frame, upon which the motor angle-irons engage, the vertical web of said motor angle-iron having a notch in the extremity, which notch engages with the horizontal web of the angle-iron on the frame.

8. In a motor-vehicle, the combination with a frame, and a motor, angle-irons on the sides of the motor, forming a supporting-frame therefor, and angle-irons on the frame, upon which the motor angle-irons engage, the vertical web of said motor angle-iron having a notch in the extremity, which notch engages with the horizontal web of the angle-iron on the frame, the said frame having a notch on the horizontal web, by means of which the motor angle-irons may be lifted out.

This specification signed and witnessed this 29th day of September, 1904.

JOHN M. LANSDEN, Jr.

Witnesses:
DAVID S. LANSDEN,
JAS. F. COLEMAN.